United States Patent [19]

Muramatsu et al.

[11] Patent Number: 5,703,665
[45] Date of Patent: Dec. 30, 1997

[54] LIQUID CRYSTAL DEVICE HAVING RESILIENT SUPPORT MEMBERS ARRANGED AT VERTICES OF AN ISOSCELES TRIANGLE

[75] Inventors: Masayoshi Muramatsu, Hoi-gun; Masaaki Ozaki, Kariya, both of Japan

[73] Assignee: Nippondenso Co., Ltd., Kariya, Japan

[21] Appl. No.: 677,327

[22] Filed: Jul. 2, 1996

[30] Foreign Application Priority Data

Jul. 3, 1995 [JP] Japan ................................ 7-167547
Dec. 19, 1995 [JP] Japan ................................ 7-330702

[51] Int. Cl.[6] ................................................ G02F 1/1333
[52] U.S. Cl. ................................................ 349/60; 349/58
[58] Field of Search ........................ 349/58, 60; 361/681;
364/708.1

[56] References Cited

U.S. PATENT DOCUMENTS 5,150,231  9/1992  Iwamoto et al. ................ 349/60
5,182,660  1/1993  Tanaka ............................ 349/60
5,400,160  3/1995  Takahashi et al. ............... 349/60

FOREIGN PATENT DOCUMENTS 6-273723  9/1994  Japan.

OTHER PUBLICATIONS

Journal Of Nippondenso Technical Disclosure, 51–111, Jan. 15, 1987.

*Primary Examiner*—William L. Sikes
*Assistant Examiner*—Tiep H. Nguyen
*Attorney, Agent, or Firm*—Cushman, Darby & Cushman, IP Group of Pillsbury Madison & Sutro LLP

[57] ABSTRACT

In a liquid crystal device, three semi-spherical protrusions are fixed on an inner surface of a bottom wall of a spacer. These protrusions are in contact with an outer surface of an elongated sheet portion of an electrode sheet for the liquid crystal device. The protrusions form an isosceles triangle so that the electrode sheet is supported at three points. Each elastic member is held between the elongated sheet portion of the electrode sheet and a top wall of a frame at a position facing each protrusion.

20 Claims, 7 Drawing Sheets

LIQUID CRYSTAL DEVICE HAVING RESILIENT SUPPORT MEMBERS ARRANGED AT VERTICES OF AN ISOSCELES TRIANGLE

CROSS REFERENCE TO RELATED APPLICATIONS

This application is based on and claims priority from Japanese Patent Application Nos. 7-167547 and 7-330702, the contents of which are incorporated herein by reference.

BACKGROUND OF THE INVENTION

1. Field of the Invention

The present invention relates to a liquid crystal display device and, more particularly, to a liquid crystal device which includes a liquid crystal panel such as liquid crystal switches and the like.

2. Description of Related Art

Conventionally, for example, when fixing a liquid crystal panel of a TN (twisted nematic) type liquid crystal device and a TFT (thin film transistor) type liquid crystal device, the liquid crystal panel is usually accommodated and held in a frame with the periphery of both electrode sheets of the liquid crystal panel being accommodated and fixed between both frame members of the frame. Thus, there is a need to solidly fix the liquid crystal panel without damaging it.

In this way, for example, as shown in FIG. 12, one proposed device, as described in Japanese Laid-Open Publication Hei 6-273,723, fixes four corners P1–P4 of a liquid crystal panel 1 at four corners of a frame.

However, with this kind of construction, when an external stress is applied to the liquid crystal panel 1 such that the corner P1 of the liquid crystal panel 1 is raised towards a front direction of FIG. 12, the stress will not be absorbed and acts on the liquid crystal panel 1 at an axis which is a straight line connecting corners P2 and P4.

As a result, the liquid crystal panel 1 becomes distorted, the liquid crystals enclosed between both electrode sheets are disoriented and display spots are produced. This kind of phenomena occurs especially when a smectic liquid crystal such as antiferroelectric liquid crystal or the like is used as the liquid crystal.

SUMMARY OF THE INVENTION

In view of the foregoing problems of the prior art in mind, it is a primary object of the present invention to provide a liquid crystal device for protecting a liquid crystal panel from external forces by fixing the liquid crystal panel using a three-point support construction.

To achieve this object, a first aspect of the present invention provides a liquid crystal device which includes a liquid crystal panel, a frame for accommodating the liquid crystal panel, a holding unit disposed between the liquid crystal panel and a wall of the frame for holding the liquid crystal panel in the frame, and an interposing unit disposed between the frame and the holding unit. The interposing unit includes interposing members positioned substantially at vertices of an isosceles triangle. The interposing unit is for allowing movement of the liquid crystal panel with respect to the frame about a side of the isosceles triangle.

In this way, when stress is added to a portion of the frame, since the interposing members are positioned at vertices of the isosceles triangle, the liquid crystal panel moves around an axis which is a straight line that connects two of the interposing members. Therefore, the liquid crystal panel is not distorted even though stress is applied on the frame. Thus, the liquid crystal panel can be reliably protected from external forces.

Another aspect of the present invention provides a liquid crystal device which includes a liquid crystal panel, a frame for accommodating the liquid crystal panel, a holding unit disposed between the liquid crystal panel and a wall of the frame for holding the liquid crystal panel in the frame, and an interposing unit disposed between the frame and the holding unit. Here, the interposing unit includes interposing members positioned substantially at vertices of a triangle. The interposing unit is for allowing movement of the liquid crystal panel with respect to the frame about a side of the triangle.

Another aspect of the present invention provides a liquid crystal device in which two of the interposing members are disposed at both ends of a side of the liquid crystal panel and a remaining interposing member is disposed substantially at a center of another side of the liquid crystal panel.

An additional aspect of the present invention provides a liquid crystal device in which the interposing members are protrusions mounted on the holding unit and the interposing members are disposed to face the liquid crystal panel.

A further aspect of the present invention provides a liquid crystal device in which the protrusions have semi-spherical ends for contacting the liquid crystal panel. In this way, the liquid crystal panel can move smoothly.

Another aspect of the present invention provides a liquid crystal device in which the interposing members are made up of elastic material. In this way, the liquid crystal panel can move smoothly.

A yet further aspect of the present invention provides a liquid crystal device having an additional holding unit which has concave portions and which is disposed between the liquid crystal panel and the interposing unit, and wherein the interposing members protrude from a surface of the holding unit which faces the liquid crystal panel. The interposing members are cylindrical protrusions having semi-spherical heads facing the additional holding unit, and the concave portions of the additional holding unit are for accommodating the semi-spherical heads of the interposing members. In this way, even though the liquid crystal panel is large and heavy, the liquid crystal panel can be reliably held without shifting in a horizontal direction.

A yet further aspect of the present invention provides a liquid crystal device having an elastic unit disposed between the liquid crystal panel and another wall of the frame to face the respective interposing member.

In this way, with elastic deformation properties of the elastic unit, the movement of the liquid crystal panel is absorbed. Since the outer peripheral portion of the liquid crystal panel is accommodated between the elastic member and the holding unit, the periphery of the liquid crystal panel can be held firmly.

One other aspect of the present invention provides a liquid crystal device in which the liquid crystal panel is filled with smectic liquid crystal. In this way, even though the smectic liquid crystal fills the liquid crystal panel, since the liquid crystal panel is not distorted due to the external force as described above, the orientation of the smectic liquid crystal is not disturbed by the external force.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are hereinafter described with reference to the accompanying drawings.

Figure 1:
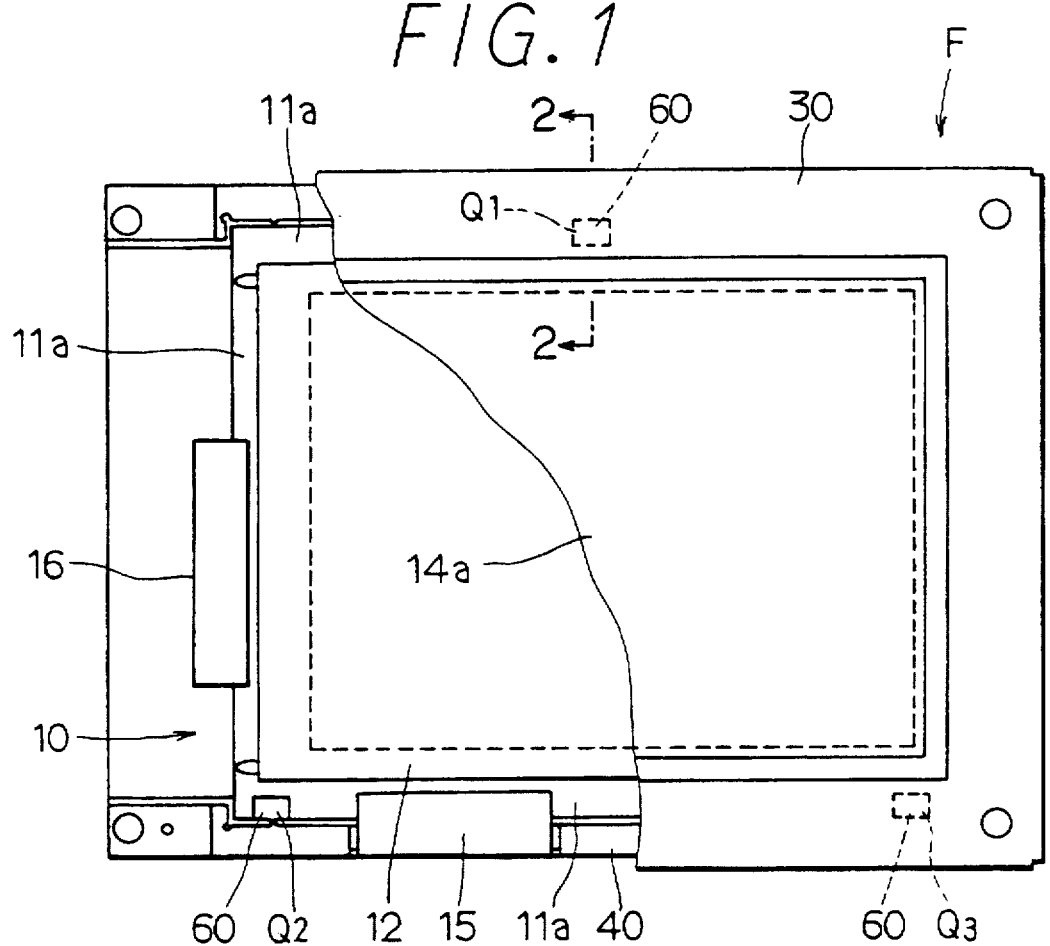
FIG. 1 is a fragmentary sectional view of a liquid crystal display device according to a first embodiment of the present invention.
Figure 2:
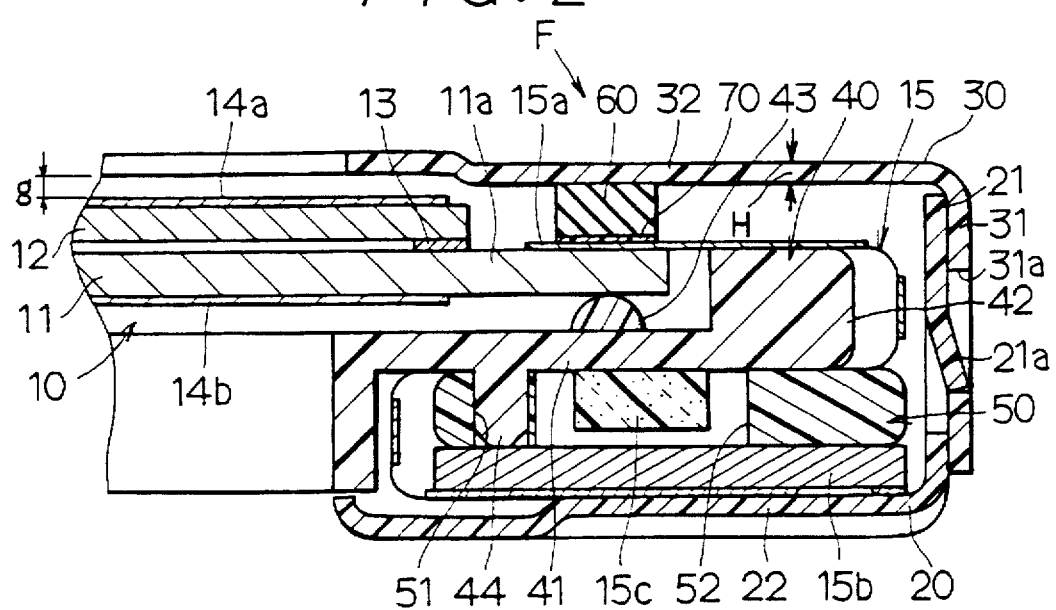
FIG. 2 is an enlarged sectional view of the liquid crystal device as seen from line 2—2 of FIG. 1.

FIG. 1 illustrates a liquid crystal display device according to a first embodiment of the present invention. The liquid crystal display device has a liquid crystal panel 10. As shown in FIGS. 1 and 2, the liquid crystal panel 10 is accommodated inside a frame F.

As shown in FIG. 2, the liquid crystal panel 10 includes a pair of electrode sheets 11, 12. Antiferroelectric liquid crystals are enclosed by a band-shaped seal 13 between the electrode sheets 11, 12. Polarizing plates 14a, 14b adhere to outer surfaces of the electrode sheets 11, 12 and are exposed externally through central opening portions of ring-shaped frame members 20 and 30 of the frame F.

Moreover, each pair of TPC (tape carrier package) 15 (FIGS. 1 and 2 shows only one TPC 15) is connected via a connecting end 15a to an inner surface of an elongated sheet portion 11a of the electrode sheet 11 elongated in relation to the other electrode sheet 12. As shown in FIG. 1, it must be noted here that the two pairs of TPC 15 are installed such that a first pair of TPC 15 is connected to an upper side of the elongated sheet portion 11a of the electrode sheet 11 with the second pair of TPC 15 being connected to a lower side of the elongated sheet portion 11a of the electrode sheet 11. Both pairs of TPC 15 are positioned to face each other.

As shown in FIG. 1, a TCP 16 is connected via its connecting end to a surface of the elongated sheet portion 11a of the electrode sheet 11.

The frame F includes frame members 20 and 30. The frame member 20 is fixed to the frame member 30 by inserting a side wall 21 into a side wall 31 of the frame member 30. A claw 21a of the side wall 21 is engaged to an engagement hole portion 31a of the side wall 31 so that a part of the side wall 21 of the frame member 20 is fixed firmly within the side wall 31 of the frame member 30.

As shown in FIG. 2, a predetermined clearance g is provided between a top wall 32 of the frame mender 30 and the polarizing plate 14a so that the polarizing plate 14a will never be in contact with the top wall 32 even if the liquid crystal panel 10 becomes inclined.

As shown in FIG. 2, spacers 40, 50, which overlap with each other, are sandwiched between the elongated sheet portion 11a of the electrode sheet 11 and a lower wall 22 of the frame member 20. In addition, the spacer 40 is positioned such that its bottom wall 41 and side wall 42 face an outer surface and an end surface, respectively, of the electrode sheet 11.

As shown in FIG. 1, one of the protrusions 43 is disposed at a central point Q1 between the pair of TCPs 15 positioned at the top side portion of the elongated sheet portion 11a of the electrode sheet 11. The other two protrusions 43 are disposed at end points Q2 and Q3 at the bottom side portion of the elongated sheet portion 11a so that these two protrusions 43 are not between the other pair of TCP 15 positioned at the bottom end side portion of the elongated sheet portion 11a of the electrode sheet 11. In this way, the electrode sheet 11 is supported by the spacer 40 using three protrusions 43 as the three-point support. Meanwhile, FIG. 2 shows only one of three semi-spherical protrusions 43 which are fixed on the spacer 40. Each protrusion 43 is in contact at one point with the outer surface of the elongated sheet portion 11a of the electrode sheet 11.

Points Q1, Q2 and Q3 form an isosceles triangle and are positioned such that center point Q1 is positioned at a vertex of the vertex angle of the isosceles triangle and each of the other end points Q2 and Q3 are positioned at each end of the base of the isosceles triangle. It must be noted here that end points Q2, Q3 are preferably at the ends of the elongated sheet portion 11a to prevent contact of an end portion of the liquid crystal panel 10 with the spacer 40 when the liquid crystal panel 10 becomes inclined.

As shown in FIG. 2, a middle portion of the TCP 15 which bends along the side wall 42 of the spacer 40 and protrudes from the elongated sheet portion 11a of the electrode sheet 11 is disposed between the spacers 40, 50. A tip portion of the TCP 15 is bent along the spacer 50 and fixed to a bottom surface of the spacer 50 via a circuit board 15b. The tip portion of the TCP 15 is connected to the circuit board 15b through soldering and the like.

Meanwhile, a cylindrical protrusion 44 of the spacer 40 is inserted in an inserting hole portion 51 of the spacer 50 via the TCP 15 to fix the position of the spacer 40 with respect to the spacer 50. A liquid crystal semiconductor chip 15c of the TCP 15 is positioned inside a penetration hole portion 52 of the spacer 50.

Each of elastic members 60 is held between the connecting end 15a of the TCP 15 and the top wall 32 of the frame member 30 at a position facing the corresponding protrusion 43. Because of their elastic properties, each of the elastic members 60 applies a predetermined load on the liquid crystal panel 10. Therefore, even though the frame F is distorted, each of the protrusions 43, which are positioned to form the isosceles triangle described above, is not detached from and remains firmly adhered to the elongated sheet portion 11a of the electrode sheet 11. Each elastic member 60 is attached to the inner surface of the elongated sheet portion 11a of the electrode sheet 11 using an adhesive 70.

When an external stress is applied to a portion corresponding to the central point Q1 (see FIGS. 1 and 3) of the top end side portion of the top wall 32 of the frame member 30, the top wall 32 is distorted at such corresponding portion.

Figure 3:
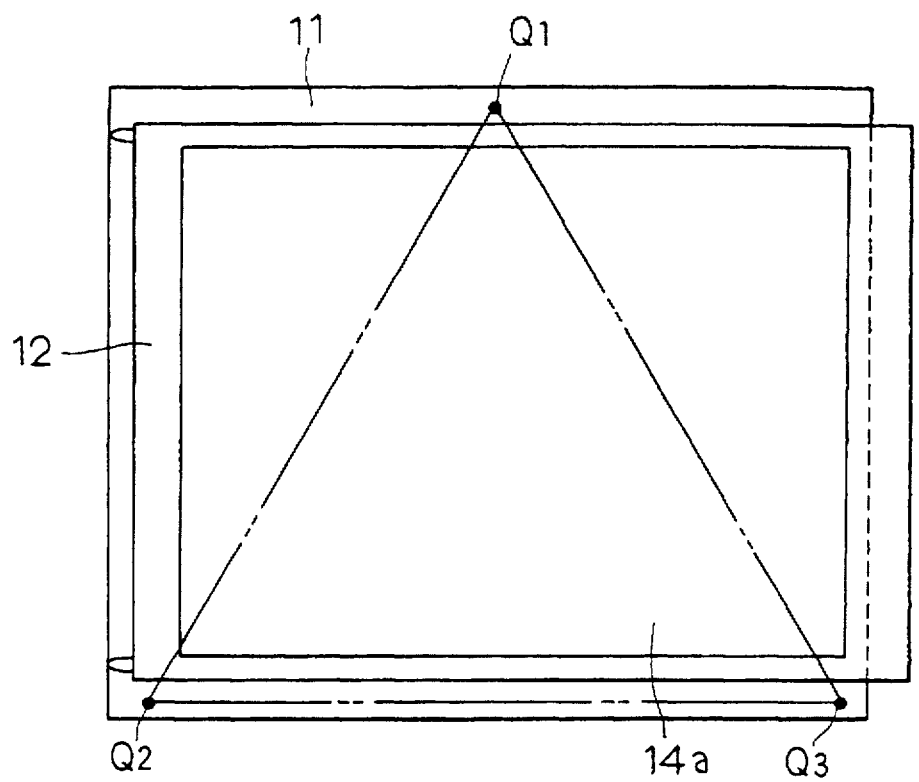
FIG. 3 is a plan view of a liquid crystal panel.
Figure 4:
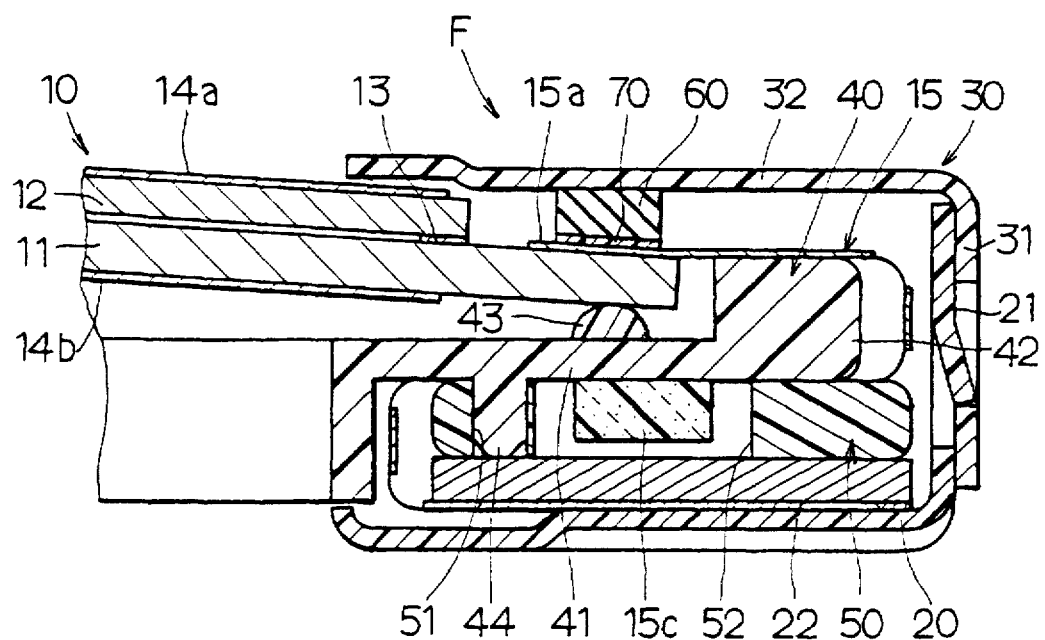
FIG. 4 is an enlarged sectional view of main parts of the liquid crystal panel according to the first embodiment.

Accordingly, the liquid crystal panel 10 leans toward the spacer 40 around an axis indicated by a straight line connecting end points Q2 and Q3 of FIG. 3 (see FIG. 4). At this point, since the protrusion 43 positioned at the central point Q1 has a spherical shape, the elongated sheet portion 11a of the electrode sheet 11 leans smoothly while being in contact with the spherical surface of the protrusion 43. Furthermore, since the elastic member 60 faces the protrusion 43 through the elongated sheet portion 11a, the liquid crystal panel 10 can smoothly incline because of the elastic deformation properties of the elastic member 60. In this case, since the central point Q1 and the end points Q2, Q3 are positioned to be vertices of the isosceles triangle described above, the liquid crystal panel 10 can incline more smoothly.

Since the liquid crystal panel 10 is held at a proper load by the elastic member 60, each protrusion 43 is always firmly in contact with the elongated sheet portion 11a of the electrode sheet 11 and thus, the elongated sheet portion 11a can incline smoothly. In this case, since the elongated sheet portion 11a of the electrode sheet 11 is held firmly between the elastic member 60 and the protrusion 43, the liquid crystal panel 10 hardly slips in the horizontal direction. Since the clearance g is provided, the polarizing plate 14a will never be in contact with the top wall 32 when the liquid crystal panel 10 becomes inclined. Meanwhile, it must be noted here that the protrusion 43 is harder than the elastic member 60.

Thus, stress is not applied on the liquid crystal panel 10 and the liquid crystal panel 10 is not distorted. Therefore, disturbance in the orientation of the antiferroelectric crystals can be certainly prevented. As a result, no display spots will be produced on the liquid crystal panel 10.

Thus, disturbance in the orientation of the antiferroelectric crystals and display spots can be prevented with such simple construction in which protrusions 43 are provided to the spacer 40 which fixes the TCP 15 to the electrode sheet 11 and elastic members 60 are provided opposite each of protrusions 43.

Since the elastic member 60 is provided at the elongated sheet portion 11a of the electrode sheet 11, a thickness H (see FIG. 2) of the frame F can be reduced.

Since the central point Q1 and the end points Q2, Q3 are at positions other than the connecting position of each TCP 15 with respect to the elongated sheet portion 11a of the electrode sheet 11, each protrusion 43 and each elastic member 60 can be easily positioned.

Figure 5:
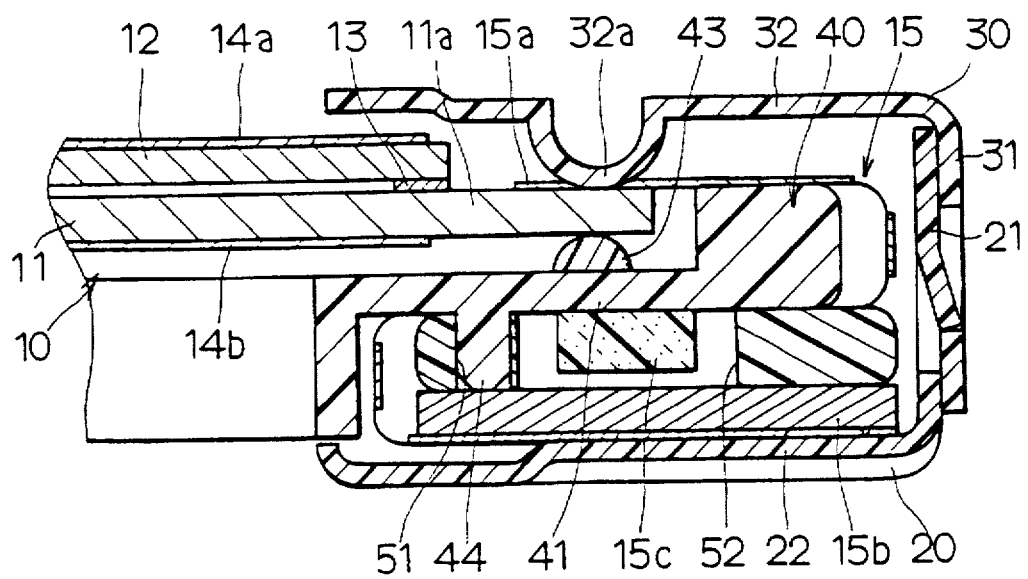
FIG. 5 is an enlarged sectional view of main parts of the liquid crystal panel according to a second embodiment of the present invention.

FIG. 5 illustrates a main portion of a second embodiment of the present invention.

As shown in FIG. 5, in this second embodiment, a semi-spherical protrusion 32a protruding towards the elongated sheet portion 11a is formed at the top wall 32 of the frame member 30 at a position facing each protrusion 43, and thus, the present embodiment does away with the elastic member 60 and the adhesive 70.

Figure 6:
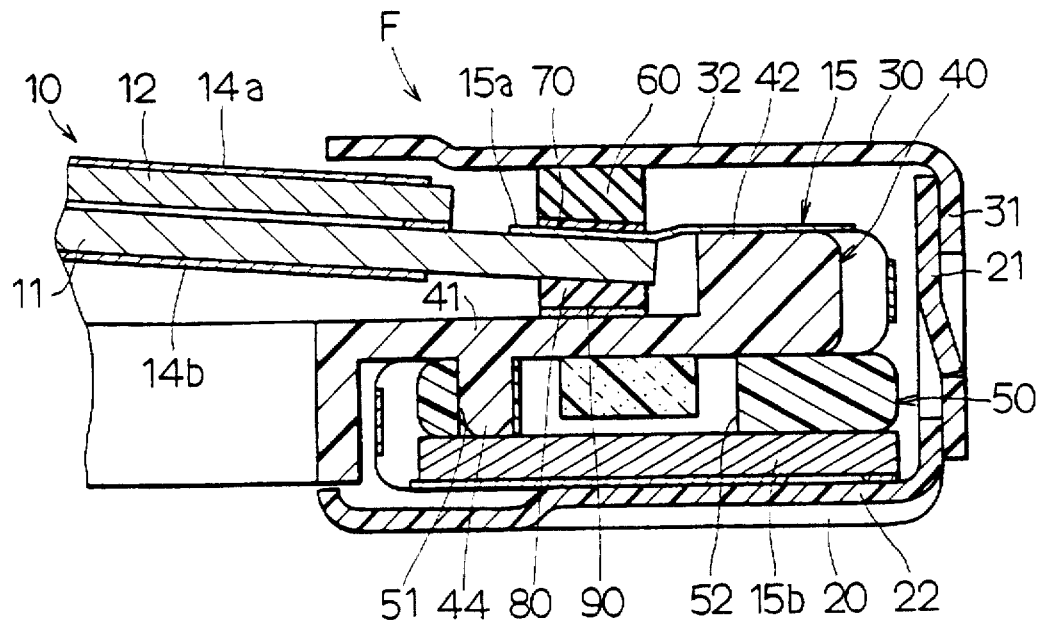
FIG. 6 is an enlarged sectional view of main parts of the liquid crystal panel according to a third embodiment of the present invention.

FIG. 6 illustrates a main portion of a third embodiment of the present invention.

As shown in FIG. 6, in this third embodiment, instead of the protrusion 43, a secondary elastic member 80 is fixed to the bottom wall 41 of the spacer 40 using an adhesive 90 and held between the elongated sheet portion 11a of the electrode sheet 11 and the spacer 40.

As a result, because of its elastic properties, the elastic member 80 enables the liquid crystal panel 10 to incline smoothly.

Figure 7:
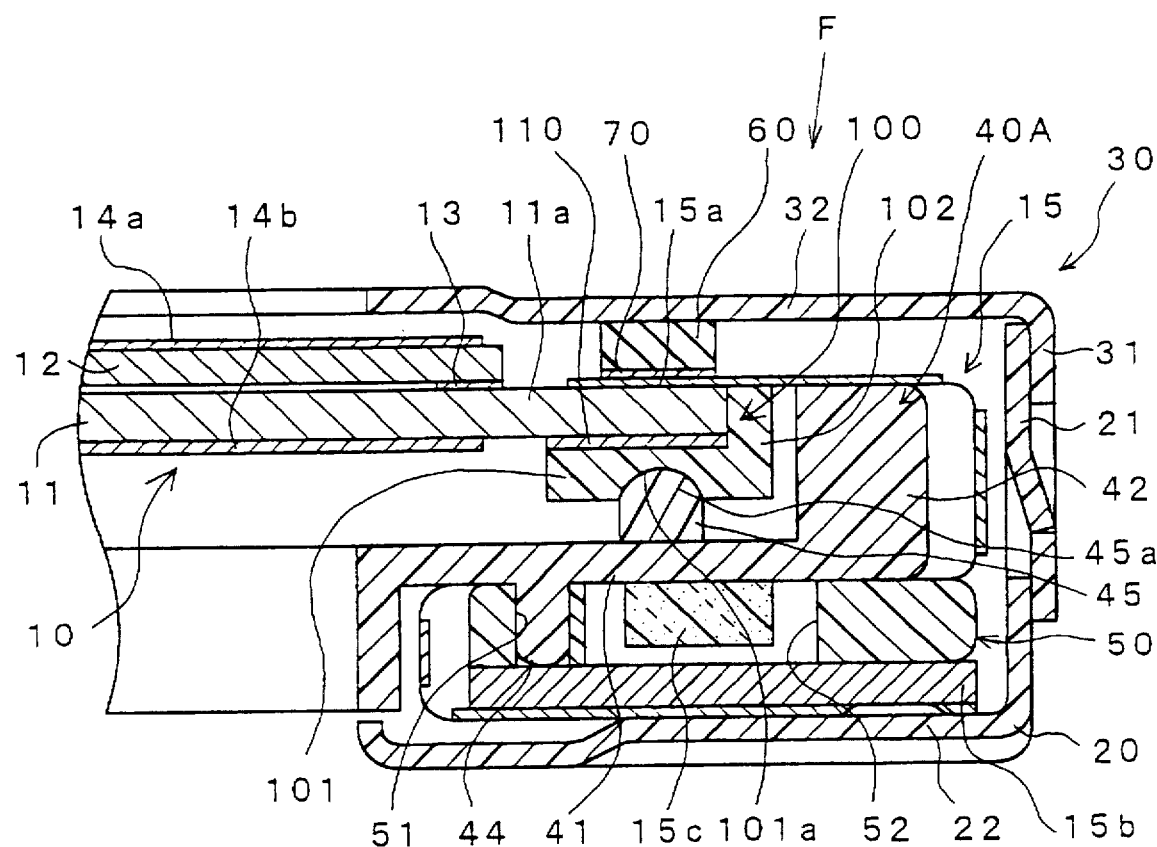
FIG. 7 is an enlarged sectional view of main parts of the liquid crystal panel according to a fourth embodiment of the present invention.
Figure 8:
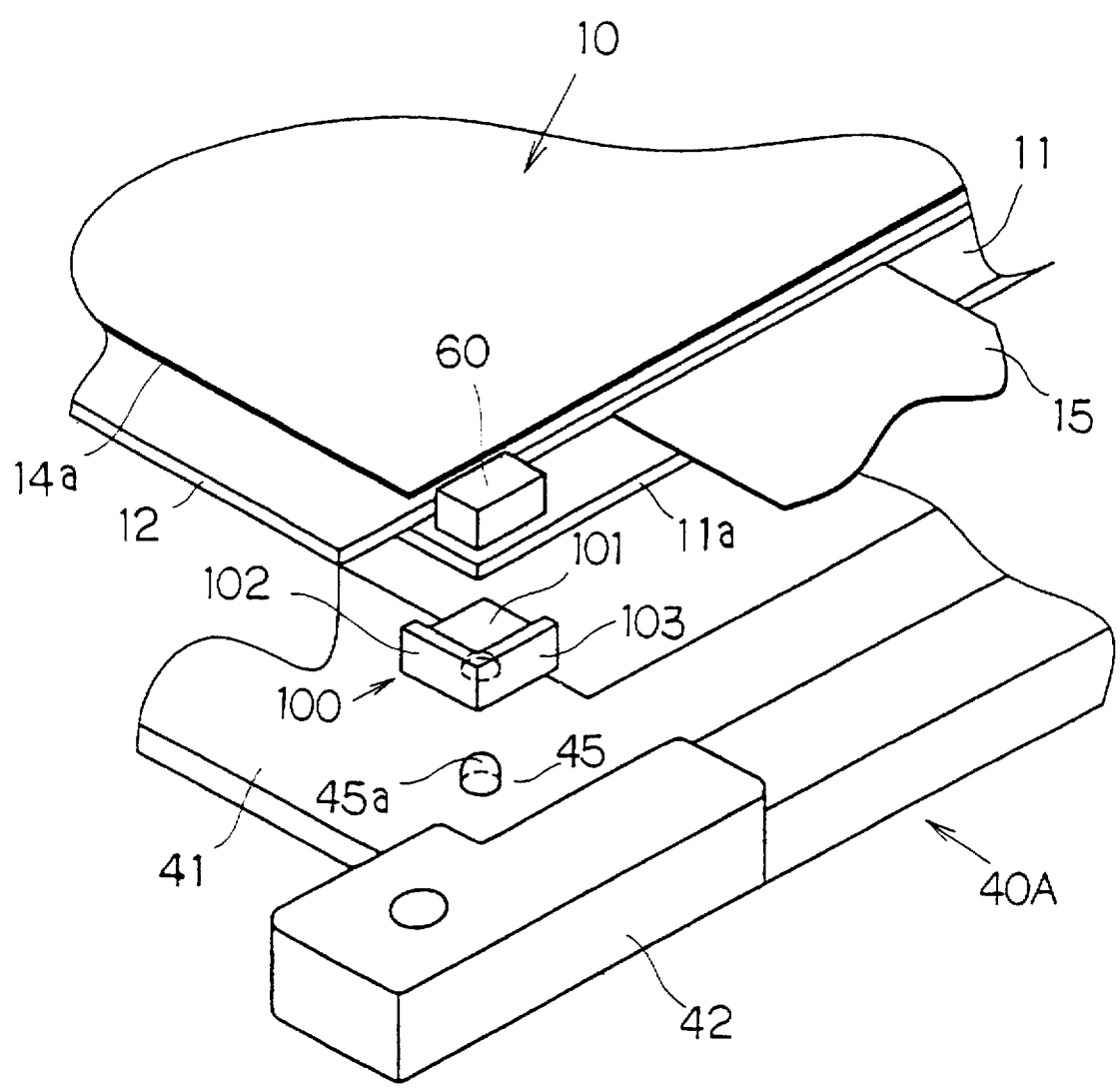
FIG. 8 is an enlarged exploded perspective view of the liquid crystal panel and both spacers according to the fourth embodiment.

FIGS. 7 and 8 illustrate a main portion of a fourth embodiment of the present invention.

As shown in FIGS. 7 and 8, in this fourth embodiment, a spacer 40A and three spacers 100 (only one spacer 100 is shown in FIGS. 7 and 8) are provided in place of the spacer 40. The spacers 100 are held between the spacer 40A and the elongated sheet portion 11a of the liquid crystal panel 10.

Instead of three semi-spherical protrusions 43 mounted on the spacer 40, the spacer 40A has three cylindrical protrusions 45, each of which has a semi-spherical portion 45a. As shown in FIG. 7, each of the protrusions 45 adheres to the bottom wall 41 at positions which face the corresponding elastic member 60.

As shown in FIGS. 7 and 8, each spacer 100 is fixed to the outer surface side of the elongated sheet portion 11a using an adhesive 110 at a position facing the corresponding elastic member 60.

In this case, each spacer 100 is made of a material harder than that of the elastic member 60. As shown in FIG. 7, the spacer 100 corresponding to the central point Q1 is formed such that the side wall 102 and bottom wall 101 form an L-shape. In the spacer 100 positioned at the central point Q1, its bottom wall 101 is fixed to the outer surface of the elongated sheet portion 11a facing the cylindrical protrusion 45 using the adhesive 110 with its side wall 102 being fixed to the end surface of the elongated sheet portion 11a.

As shown in FIG. 8, each spacer 100 corresponding to each of the end points Q2, Q3 is formed by elongating the side walls 102, 103 of adjacent sides of the bottom wall 101 into an L-shape. Each spacer 100 corresponding to each of the end points Q2, Q3 is formed such that the bottom wall 101 is fixed to the outer surface of the elongated sheet portion 11a using the adhesive 110 and faces the corresponding cylindrical protrusion 45. The side walls 102, 103 of each spacer 100 are fixed to end surfaces of the elongated sheet portion 11a that form the corners of the elongated sheet portion 11a.

A semi-spherical concave portion 101a coaxial to the corresponding protrusion 45 is formed at the bottom of each bottom wall 101 of each of the spacers 100. Each protrusion 45 is inserted to the semi-spherical concave portion 101a so that the spacer 100 can rotate around it.

In this case, a diameter of each concave portion 101a is larger than a diameter of each semi-spherical portion 45a so that the spacer 100 can rotate easily. A length in the axial direction of each protrusion 45 is set such that the spacers 40A, 100 will not be in contact with each other.

Thus, in this fourth embodiment, each spacer 100 is rotatable around the cylindrical protrusion 45 of the spacer 40A when its concave portion 101a is inserted with the semi-spherical portion 45a.

In this way, the elongated sheet portion 11a of the electrode sheet 11 and the bottom wall 101 of each spacer 100 are held and sandwiched by each elastic member 60 and the bottom wall 41 of the spacer 40A. Thus, even though the liquid crystal panel 10 is large and heavy, it can be held between each elastic member 60 and the bottom wall 41 of the spacer 40A with no slipping in the horizontal direction. Therefore, a size of the frame F does not have to be increased to accommodate and hold a large liquid crystal panel 10.

In this case, since the bottom wall 101 of the spacer 100 is fixed to the outer surface of the elongated sheet portion 11a using the adhesive 110, assembly operation of the liquid crystal panel 10 into the frame F can be improved, and slips between the liquid crystal panel 10 and the spacer 100 can be prevented.

When external stress is applied to a portion corresponding to the central point Q1 of the top side portion of the frame member 30, the top wall 32 becomes distorted in the same portion in the same way as in the previously described embodiments. Thus, the liquid crystal panel 10 leans toward the spacer 40A at an axis which is the straight line connecting the end points Q2, Q3 of the three-point support.

The semi-spherical portion 45a of each protrusion 45 of the spacer 40A is received in the concave portion 101a of each spacer 100 and the diameter of the semi-spherical portion 45a is slightly smaller than the diameter of the concave portion 101a. Each protrusion 45 has an axial length such that the bottom wall 101 of the spacer 100 will not be in contact with the spacer 40A.

The bottom wall 101 of each spacer 100 rotates freely about the semi-spherical portion 45a of each protrusion 45. Since each elastic member 60 can be shaped in accordance with an inclination of the liquid crystal panel 10, the liquid crystal panel 10 is held such that it is not affected by any distortion in the frame member 30.

Therefore, even though the frame member 30 becomes distorted, no stress is applied to the liquid crystal panel 10 and so, the disturbance in the orientation of the antiferroelectric liquid crystal can be prevented.

Figure 9:
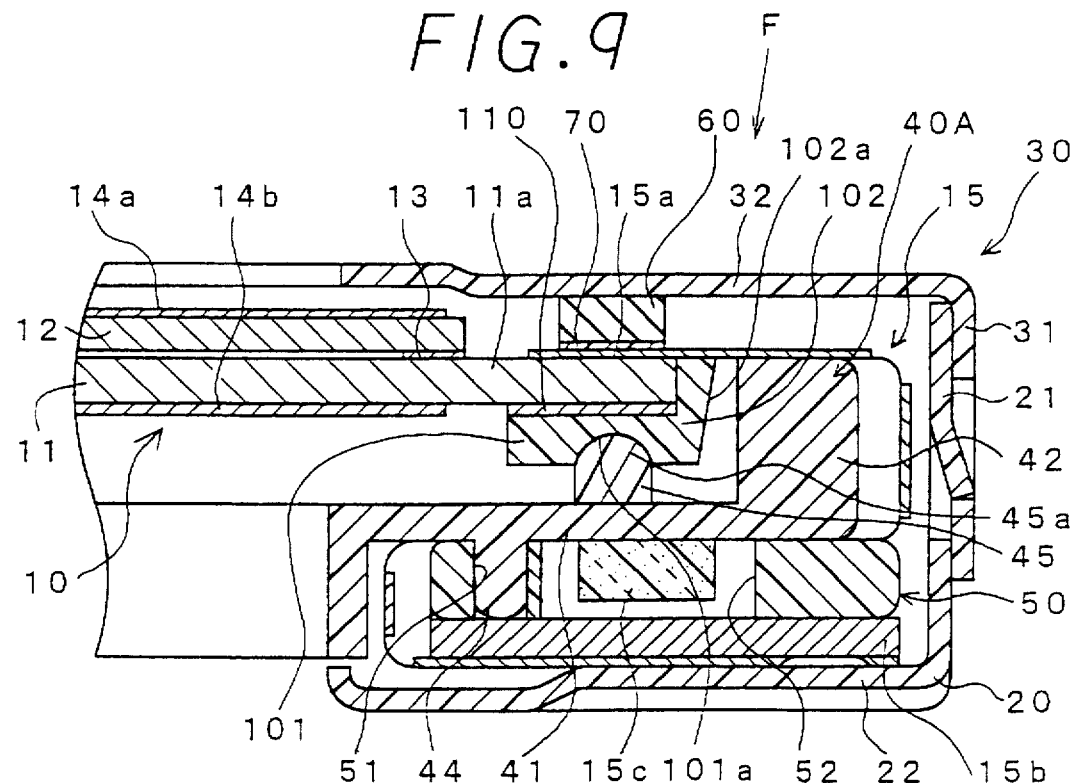
FIG. 9 is an enlarged sectional view of main parts of the liquid crystal panel according to a fifth embodiment of the present invention.

In a fifth embodiment of the present invention, the outer surface 102a of the side wall 102 of the spacer 100 corresponding to the central point Q1 is inclined as shown in FIG. 9 with respect to the inner surface of the side wall 42 of the spacer 40A. In the same way, the outer surfaces of the side walls of the two other spacers 100 that correspond to the end points Q2, Q3 are also formed as inclined surfaces with respect to the inner surface of the side wall 42 of the spacer 40A.

Thus, when the liquid crystal panel 10 is inserted into the spacer 40A in a vertical direction, the outer surface of the side wall of each spacer 100 serves as a guide to the inner surface of the side wall 42 of the spacer 40A. Therefore, the liquid crystal panel 10 can be assembled in the spacer 40A smoothly. As a result, the semi-spherical portion 45a of each protrusion 45 can be easily inserted into the concave portion 101a of each spacer 100.

Figure 10:
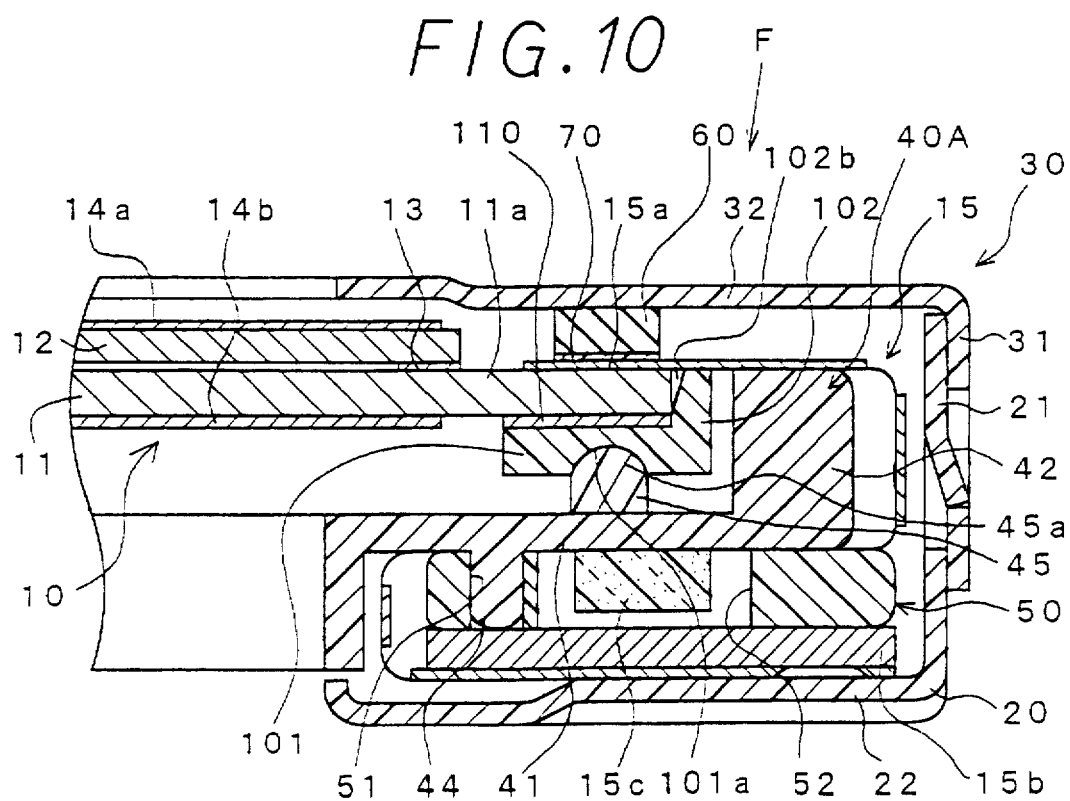
FIG. 10 is an enlarged sectional view of main parts of the liquid crystal panel according to a sixth embodiment of the present invention.

In a sixth embodiment of the present invention shown in FIG. 10, the inner surface 102b of the side wall 102 of the spacer 100 corresponding to the central point Q1 is inclined with respect to the end surface of the elongated sheet portion 11a of the electrode sheet 11. In the same way, the inner surfaces of the side walls of the other spacers 100 corresponding to the end points Q2, Q3 are inclined with respect to the end surface of the elongated sheet portion 11a.

Thus, when each spacer 100 is fixed to the elongated sheet portion 11a of the electrode sheet 11, the inner surface 102b of the side wall 102 of each spacer 100 serves as a guide to the end surface of the elongated sheet portion 11a. Therefore, each spacer 100 can be fixed smoothly to the elongated sheet portion 11a of the electrode sheet 11.

Figure 11:
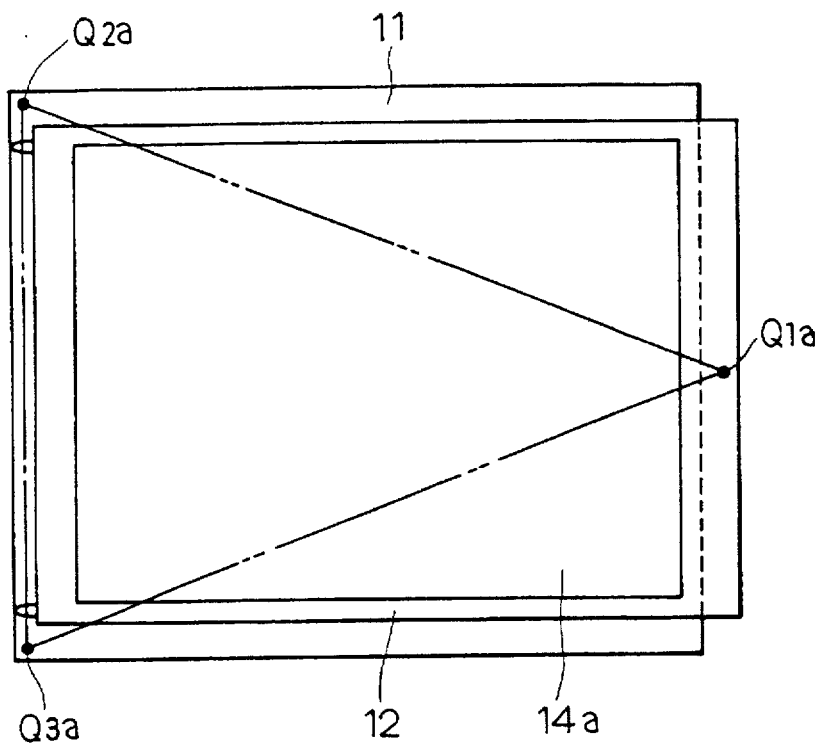
FIG. 11 is a plan view illustrating the liquid crystal panel according to a seventh embodiment of the present invention.
Figure 12:
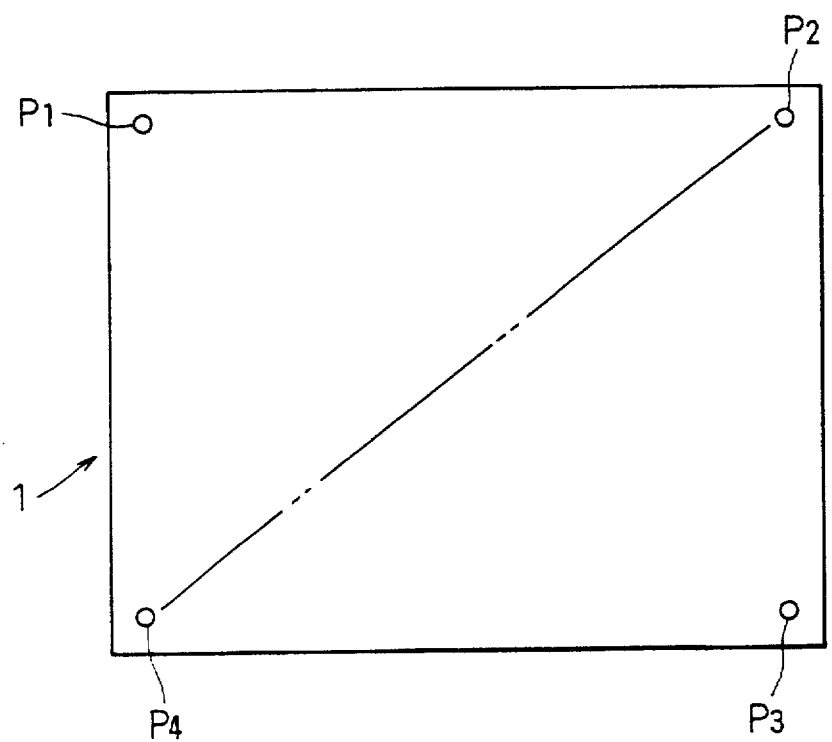
FIG. 12 is a plan view of a conventional liquid crystal panel having a four-point support construction.

FIG. 11 illustrates a main portion of a seventh embodiment of the present invention.

In this seventh embodiment, as shown in FIG. 11, the three-point support of the liquid crystal panel 10 can also be shaped as an isosceles triangle formed by three points Q1a, Q2a and Q3a (which correspond to central point Q1 and end points Q2, Q3 of the previous embodiments). Here, the central point Q1a is positioned at a vertical center of the inner surface of the right end side portion of the electrode sheet 12 while end points Q2a, Q3a are positioned at both ends of the inner surface of the left end side portion of the electrode sheet 11.

The present embodiment also gives the same effects as the other embodiments described above.

Although the present invention has been fully described in connection with preferred embodiments thereof with reference to the accompanying drawings, it will be noted that various changes and modifications will become apparent to those skilled in the art.

For example, each protrusion 43 can be provided at the outer surface of the elongated sheet portion 11a of the electrode sheet 11 in place of the spacer 40.

Also, the protrusions 43 need not be positioned to form an isosceles triangle but may also be positioned to form any triangle.

The present invention is not limited to the liquid crystal display device but may also be applied to any kind of liquid crystal device such as a liquid crystal switch having a liquid crystal panel or the like.

Although the antiferroelectric liquid crystal is used as the liquid crystal in the liquid crystal panel 10 in the above-described embodiments, a liquid crystal panel 10 enclosing smectic liquid crystal such as ferroelectric liquid crystal and TN-type liquid crystal may also be used in the present invention.

Such changes and modifications are to be understood as being included with the scope of the present invention as defined by the appended claims.

What is claimed is:

1. A liquid crystal device comprising:
    a liquid crystal panel;
    a frame for accommodating said liquid crystal panel;
    holding means disposed between said liquid crystal panel and a wall of said frame for holding said liquid crystal panel in said frame; and
    interposing means disposed between said frame and said holding means, said interposing means including interposing members positioned substantially at three vertices of an isosceles triangle, said interposing means being for allowing movement of said liquid crystal panel with respect to said frame about a side of said isosceles triangle.

2. A liquid crystal device according to claim 1, wherein:
    two of said interposing members are disposed at both ends of a side of said liquid crystal panel and a remaining interposing member is disposed substantially at a center of another side of said liquid crystal panel.

3. A liquid crystal device according to claim 1, wherein:
    said interposing members are protrusions mounted on said holding means, and
    said interposing members are disposed to face said liquid crystal panel.

4. A liquid crystal device according to claim 3, wherein:
    said protrusions have semi-spherical ends for contacting said liquid crystal panel.

5. A liquid crystal device according to claim 1, wherein:
    said interposing members are made up of elastic material.

6. A liquid crystal device according to claim 1, said liquid crystal device further comprising:

additional holding means disposed between said liquid crystal panel and said interposing means, said additional holding means including concave portions;

wherein said interposing members protrude from a surface of said holding means which faces said liquid crystal panel, said interposing members are cylindrical protrusions having semi-spherical heads facing said additional holding means, and said concave portions of said additional holding means are for accommodating said semi-spherical heads of said interposing members.

7. A liquid crystal device according to claim 1, said liquid crystal device further comprising:

elastic means disposed between said liquid crystal panel and another wall of said frame to face said interposing members.

8. A liquid crystal device according to claim 1, wherein:

another wall of said frame includes a concavity for contacting said liquid crystal panel.

9. A liquid crystal device according to claim 1, wherein:

said liquid crystal panel is filled with smectic liquid crystal.

10. A liquid crystal device comprising:

a liquid crystal panel;

a frame for accommodating said liquid crystal panel;

holding means disposed between said liquid crystal panel and a wall of said frame for holding said liquid crystal panel in said frame; and interposing means disposed between said frame and said holding means, said interposing means being interposing members positioned substantially at three vertices of a triangle, said interposing means being for allowing movement of said liquid crystal panel with respect to said frame about a side of said triangle.

11. A liquid crystal device according to claim 10, wherein:

two of said interposing members are disposed at both ends of a side of said liquid crystal panel and a remaining interposing member is disposed substantially at a center of another side of said liquid crystal panel.

12. A liquid crystal device according to claim 10, wherein:

said interposing members are protrusions mounted on said holding means, and said interposing members are disposed to face said liquid crystal panel.

13. A liquid crystal device according to claim 12, wherein:

said protrusions have semi-spherical ends for contacting said liquid crystal panel.

14. A liquid crystal device according to claim 10, wherein:

said interposing members are made up of elastic material.

15. A liquid crystal device according to claim 10, said liquid crystal device further comprising:

additional holding means disposed between said liquid crystal panel and said interposing means, said additional holding means including concave portions;

wherein said interposing members protrude from a surface of said holding means which faces said liquid crystal panel, said interposing members are cylindrical protrusions having semi-spherical heads facing said additional holding means, and said concave portions of said additional holding means are for accommodating said semi-spherical heads of said interposing members.

16. A liquid crystal device according to claim 10, said liquid crystal device further comprising:

elastic means disposed between said liquid crystal panel and another wall of said frame to face said interposing members.

17. A liquid crystal device according to claim 10, wherein:

another wall of said frame includes a concavity for contacting said liquid crystal panel.

18. A liquid crystal device according to claim 10, wherein:

said liquid crystal panel is filled with smectic liquid crystal.

19. A liquid crystal device comprising:

a liquid crystal panel;

a frame for accommodating said liquid crystal panel;

holding means disposed between said liquid crystal panel and a wall of said frame for holding said liquid crystal panel in said frame; and protrusions disposed on said holding means, said protrusions positioned substantially at three vertices of an isosceles triangle, said protrusions and said holding means contacting only at said vertices.

20. A liquid crystal device comprising:

a liquid crystal panel;

a frame for accommodating said liquid crystal panel;

holding means disposed between said liquid crystal panel and a wall of said frame for holding said liquid crystal panel in said frame;

protrusions disposed on said holding means, said protrusions positioned substantially at three vertices of an isosceles triangle, said protrusions being for allowing movement of said liquid crystal panel with respect to said frame about a side of said isosceles triangle; and elastic means disposed between said liquid crystal panel and another wall of said frame, said elastic means being disposed to face said protrusions.

* * * * *